US012613154B1

(12) United States Patent
Neidigk et al.

(10) Patent No.: US 12,613,154 B1
(45) Date of Patent: Apr. 28, 2026

(54) RESISTANCE-BASED TEXTILE IMPACT SENSOR SYSTEMS

(71) Applicant: National Technology & Engineering Solutions of Sandia, LLC, Albuquerque, NM (US)

(72) Inventors: Stephen Neidigk, Albuquerque, NM (US); Aaron McMullan, Albuquerque, NM (US); Michael Bolduc, Albuquerque, NM (US); Joshua Romano, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 696 days.

(21) Appl. No.: 17/722,558

(22) Filed: Apr. 18, 2022

Related U.S. Application Data

(60) Provisional application No. 63/176,609, filed on Apr. 19, 2021.

(51) Int. Cl.
 *G01L 5/00* (2006.01)
 *G01L 5/101* (2020.01)
 *G01L 5/1623* (2020.01)

(52) U.S. Cl.
 CPC .......... *G01L 5/0052* (2013.01); *G01L 5/1623* (2020.01); *G01L 5/101* (2013.01)

(58) Field of Classification Search
 CPC ...... G01L 5/101; G01L 5/1623; G01L 5/0052
 (Continued)

(56) References Cited

U.S. PATENT DOCUMENTS 4,859,986 A * 8/1989 Van Auken ........ A63B 71/0605
 340/665
8,948,839 B1 * 2/2015 Longinotti-Buitoni .....................
 A61B 5/6806
 600/382
 (Continued)

FOREIGN PATENT DOCUMENTS

CN 101788352 A * 7/2010
CN 102414546 A * 4/2012 ............. H10D 48/50
 (Continued)

OTHER PUBLICATIONS

Translation CN-101788352 (Year: 2010).*
 (Continued)

*Primary Examiner* — Peter J Macchiarolo
*Assistant Examiner* — Monica S Young
(74) *Attorney, Agent, or Firm* — Daniel J. Jenkins; Kenneth Paul McNeill

(57) ABSTRACT

An innovative and unique method to create a resistance-based textile impact sensor has been demonstrated. The sensor is comprised of very low-cost materials and can detect impact and pressure. The sensor is highly conformable and constructed in such a way that make it tailorable for applications on varying geometries, detection sensitivity and ruggedness requirements. The impact sensor system includes a non-conductive carrier material. A pair of conductive wire traces are attached to the carrier material. A plurality of threads are provided to attach the conductive traces to the carrier material. A non-conductive covering material is positioned over the conductive traces opposite the carrier material. A conductive sheet is disposed over the (Continued)

covering material. The covering material is applied to the conductive traces to at least partially cover the surface of the at least two conductive traces facing the conductive sheet.

17 Claims, 4 Drawing Sheets

(58) Field of Classification Search
USPC ........................................................... 73/842
See application file for complete search history.

(56) References Cited

U.S. PATENT DOCUMENTS

| | | | | |
|---|---|---|---|---|
| 9,274,654 | B2 * | 3/2016 | Slobodin | G06F 3/0445 |
| 2011/0074380 | A1 * | 3/2011 | Jeon | H05B 3/56 |
| | | | | 174/250 |
| 2016/0070347 | A1 * | 3/2016 | McMillen | H03K 17/964 |
| | | | | 345/173 |
| 2016/0328043 | A1 * | 11/2016 | Moller | G06F 3/0416 |
| 2017/0232300 | A1 * | 8/2017 | Tran | G06F 1/163 |
| | | | | 434/247 |
| 2018/0073942 | A1 * | 3/2018 | Wu | G01L 5/165 |
| 2019/0132948 | A1 * | 5/2019 | Longinotti-Buitoni | |
| | | | | A61B 5/6805 |
| 2019/0243062 | A1 * | 8/2019 | Fok | G01L 1/243 |
| 2019/0310144 | A1 * | 10/2019 | Sun | G06F 3/0414 |
| 2020/0011749 | A1 * | 1/2020 | Sun | G06F 3/045 |
| 2020/0125195 | A1 * | 4/2020 | Tremmel | G06F 3/041 |
| 2021/0172975 | A1 * | 6/2021 | Song | A63B 71/0605 |

FOREIGN PATENT DOCUMENTS

| | | | | | | |
|---|---|---|---|---|---|---|
| CN | 107428200 | A | * | 12/2017 | | B60C 19/12 |
| CN | 114441943 | A | * | 5/2022 | | G01R 31/2817 |
| CN | 117850612 | A | * | 4/2024 | | G06F 3/04144 |
| CN | 118131947 | A | * | 6/2024 | | G06F 3/045 |
| EP | 0360892 | A1 | * | 9/1988 | | |
| GB | 2461712 | A | * | 1/2010 | | D02G 3/441 |
| JP | 2002195894 | A | * | 7/2002 | | E05F 15/44 |
| JP | 2009042108 | A | * | 2/2009 | | |
| KR | 20140083841 | A | * | 7/2014 | | H05B 3/342 |
| WO | WO-2015014950 | A1 | * | 2/2015 | | G01L 1/205 |
| WO | WO-2017032680 | A1 | * | 3/2017 | | B60R 19/483 |
| WO | WO-2022203607 | A2 | * | 9/2022 | | G01L 1/18 |

OTHER PUBLICATIONS

Takamatsu, S., Matsumoto, K., and Shimoyama, I., Stretchable Yarn of Display Elements, 2019 IEEE 22nd International Conference on Micro Electric Mechanical Systems, Sorrento, Italy, Jan. 25-29, 2009, Mar. 27, 2009, 1023-1026, IEEE, Piscataway, NJ.

Bhattacharjee, T., Jain, A., Vaish, S., Killpack, M. D., and Kemp, C. C., Tactile Sensing over Articulated Joints with Stretchable Sensors, 2013 World Haptics Conference (WHC), Daejeon, South Korea, Apr. 14-18, 2013, 103-108, IEEE, Piscataway, NJ.

Vena, A., Moradi, E., Koski, K., Babar, A. A., Sydänheimo, L., Ukkonen, L., and Tentzeris, M. M., Design and Realization of Stretchable Sewn Chipless RFID Tags and Sensors for Wearable Applications, 2013 IEEE International Conference on RFID (RFID), Orlando, FL, Apr. 30-May 2, 2013, Jun. 27, 2013, 176-183, IEEE, Piscataway, NJ.

Büscher, G., Koiva, R., Schurman, C., Haschke, R., and Ritter, H. J., Tactile Dataglove with Fabric-Based Sensors, 2012 12th IEEE-RAS International Conference on Humanoid Robots, Osaka, Japan, Nov. 29-Dec. 1, 2012, 204-209, IEEE, Piscataway, NJ.

Yun, D., Park, J., and Yun, K., Highly Stretchable Energy Harvester Using Piezoelectric Helical Structure for Wearable Applications, Electronics Letters, vol. 51, Issue No. 3, 284-285, IEEE, Piscataway, NJ (Feb. 5, 2015).

Yokus, M. A., Foote, R., and Jur, J. S., Printed Stretchable Interconnects for Smart Garments: Design, Fabrication, and Characterization, IEEE Sensors Journal, vol. 16, Issue No. 22, 7967-7976, IEEE, Piscataway, NJ (Nov. 15, 2016).

Ponraj, G., Kirthika, S. K., Thakor, N. V., Yeow, C., Kukreja, S. L., and Ren, H., Development of Flexible Fabric Based Tactile Sensor for Closed Loop Control of Soft Robotic Actuator, 2017 13th IEEE Conference on Automation Science and Engineering (CASE), Xi'an, China, Aug. 20-23, 2017, 1451-1456, IEEE, Piscataway, NJ.

Perera, T. G. Y. S., Mohotti, M. P. S., and Perera, M. Y. A., Stretchable Conductive Yarn for Electronic Textiles Made Using Hollow Spindle Spinning, 2018 Moratuwa Engineering Research Conference (MERCon), Moratuwa, Sri Lanka, May 30-Jun. 1, 2018, Jul. 31, 2018, 544-548, IEEE, Piscataway, NJ.

Suchorab, Z., Malec, A., Sobczuk, H., Lagod, G., Gorgol, I., Lazuka, E., Brzyski, P., and Trnik, A., Determination of Time Domain Reflectometry Surface Sensors Sensitivity Depending on Geometry and Material Moisture, Sensors, vol. 22, Issue No. 3, 735-750, MDPI (Jan. 19, 2022).

* cited by examiner

28

10

15

12,14

15

28

12

28

15

15

14

RESISTANCE-BASED TEXTILE IMPACT SENSOR SYSTEMS

CROSS-REFERENCE TO RELATED PATENT APPLICATIONS

This application claims priority to, and the benefit of U.S. Provisional Patent Application Ser. No. 63/176,609 filed Apr. 19, 2021, entitled "RESISTANCE-BASED TEXTILE IMPACT SENSOR SYSTEM", which is hereby incorporated by reference.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The invention relates generally to sensors, and more particularly to impact sensors.

Impact sensors have a wide variety of applications from Taekwondo hit sensors that are part of a uniform or vest to detecting an intruder in a secure facility. Hit sensors can also be used in aircraft and vehicle structures to detect hail impact or other unexpected impact.

However, previous impact sensors have not been able to be integrated into various platforms in a manner that improves sensitivity and that allows for sensitivity tuning and directional capabilities.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to an impact sensor system. The impact sensor system includes a non-conductive carrier material. A pair of conductive wire traces are attached to the carrier material. A plurality of threads are provided to attach the conductive traces to the carrier material. A non-conductive covering material is positioned over the conductive traces opposite the carrier material. A conductive sheet is disposed over the covering material. The covering material is applied to the conductive traces to at least partially cover the surface of the at least two conductive traces facing the conductive sheet.

Another embodiment relates to an article including a sensor system attached to the article. The sensor system includes a non-conductive carrier material. Conductive traces are attached to the carrier material by threads. A non-conductive covering material overlays the conductive traces opposite the carrier material. A conductive sheet is disposed over the covering material. The covering material is applied to the conductive traces partially or completely covering the surface of the conductive traces facing the conductive sheet.

Another embodiment relates to an impact sensing method, including: sensing a change in conductance between two conductive traces that has been caused by bringing a conductive sheet into contact with the two conductive traces; determining an impact in response to the sensed change in conductance; indicating an impact; and generating an alarm.

According to an embodiment of the disclosure, a sensor system is disclosed that includes a non-conductive carrier material, at least two conductive traces attached to the carrier material, a covering material attaching the at least two conductive traces to the carrier material, and a conductive sheet disposed over the covering material. The covering material is applied to the at least two conductive traces so as to not completely cover the surface of the at least two conductive traces facing the conductive sheet. Various articles may be formed and/or include the sensor system.

According to another embodiment of the disclosure, a method of forming a sensor system is disclosed that includes attaching at least two conductive traces to a non-conductive carrier material by an attachment system that does not completely cover the at least two conductive traces on the surface opposite the surface proximate the non-conductive carrier material, and disposing a conductive sheet over the attachment system According to another embodiment of the disclosure, a sensing method is disclosed that includes sensing a change in conductance between two conductive traces that has been caused by bringing a conductive sheet into contact with the two conductive traces, the change in conductance indicating an impact.

According to another embodiment of the disclosure, a detection method is disclosed that includes sensing a change in conductance between two conductive traces that has been caused by bringing a conductive sheet into contact with the two conductive traces, the change in conductance indicating an alarm.

An advantage of the present invention is a hit sensor that is made for lower cost, added flexibility, ruggedness, light weight and increased accuracy of hit detection.

Another advantage of the present invention is a hit sensor that is highly conformable.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
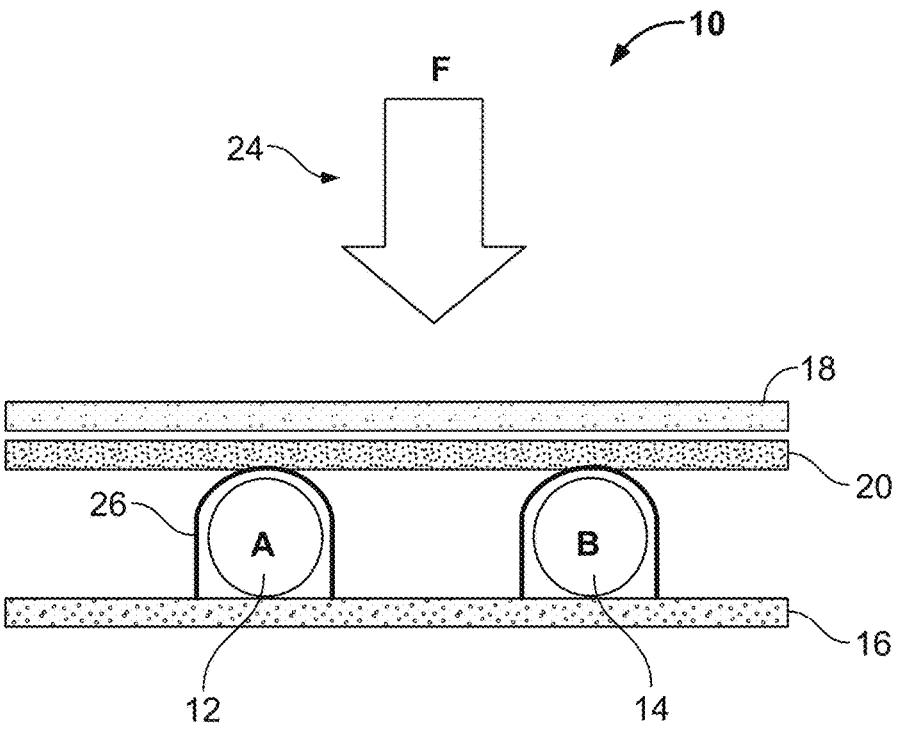
FIG. 1 is a schematic showing an arrangement for an exemplary impact sensor according to an embodiment of the disclosure.

Referring to FIG. 1, the present disclosure is directed toward hit sensors based on resistive touch. The hit sensor, generally designated as 10 includes wire traces 12, 14 (indicated by letters A, B, respectively). Wire traces 12, 14 are attached to a carrier material 16. A conductive sheet 18 is placed over the wire traces 12, 14. A nonconductive material 20 is disposed between the wire traces 12, 14 and conductive sheet 18. The nonconductive material 20 includes openings, slots or other apertures between wire traces 12, 14 and conductive sheet 18, which allows for electrical contact between the wire traces 12, 14 and conductive sheet 18 upon a compressive force, indicate by arrow 24, being applied to hit sensor 10. In an embodiment, wire traces 12, 14 may be attached to the carrier material by another nonconductive material, e.g., threads 26. In an embodiment, the nonconductive material may be thread 26 formed of cotton, polymer or mixtures thereof. In an embodiment, the thread 26 may be Kevlar® thread. In other embodiments, wire traces 12, 14 may be a conductive thread or yarn. In an embodiment, thread 26 may be attached by stitching the thread over wire traces 12, 14 into carrier material 16. In an embodiment, thread 26 may be attached by embroidery or technical embroidery, also referred to as tailored wire placement.

Figure 2A:
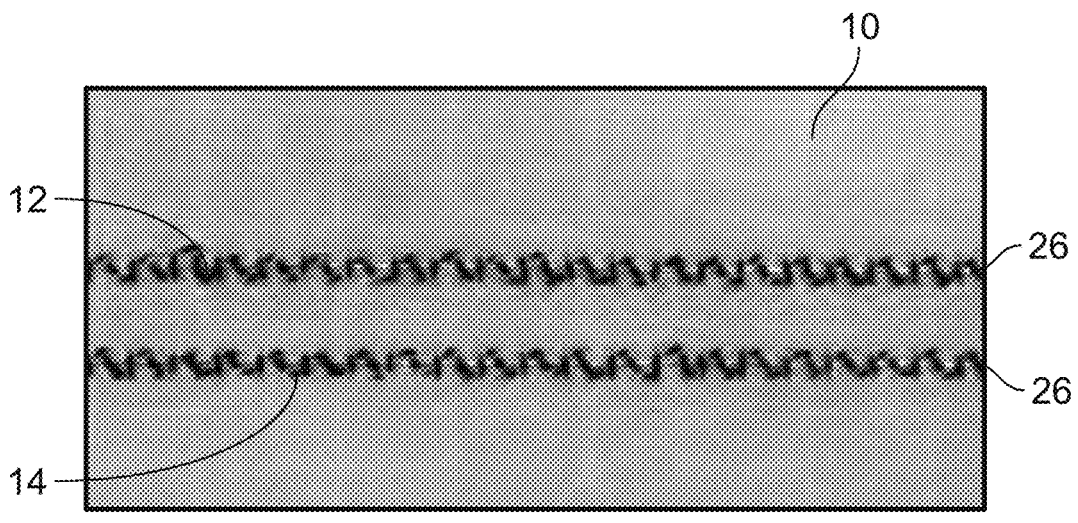
FIG. 2A shows an impact sensor of FIG. 1 having a high stitch density.

FIG. 1 shows an exemplary embodiment in which a cross-section of threads 26 are covering wire traces 12, 14 according to an embodiment of the disclosure. FIG. 2A shows a plan view of two wire traces 12, 14 that have been sewn to the base carrier material 16 using technical embroidery to make the textile impact sensor according to an embodiment of the disclosure. As can be seen in FIG. 1, the conductive wire traces 12, 14 are separated by a separation distance S. In the exemplary embodiment shown in FIG. 1, two conductive wire traces 12, 14 are used. In other embodiments, two or more conductive wire traces 12, 14 may be used to cover a desired area. In other embodiments, the separation distance S may be the same between the conductive wire traces 12, 14 covering an area. In other embodiments, the separation distance S may vary over portions of areas to which the conductive wire traces 12, 14 are applied.

In this exemplary embodiment, the conductive wire traces 12, 14 are formed of conductive wire. The conductive wire traces 12, 14 may be formed from solid wire or stranded wire. In one exemplary embodiment, the conductive wire is made of copper. In other embodiments, the conductive wire may be formed of other conductive metals, alloys, conductive polymer, composites and mixtures thereof. In other embodiments, the conductive wire traces 12, 14 may be formed from a conductive polymer material. In an embodiment, the conductive wire traces 12, 14 may be steel braided cable. In another embodiment, the conductive wire traces 12, 14 may be formed of conductive carbon nano tube material, such as, but not limited to conductive carbon nano tube yarn.

In one exemplary embodiment, carrier material 16 may be formed from a polymer based fabric. In alternate embodiments, the carrier material may be formed of synthetic or natural materials. In an embodiment, the carrier material may be made of a flexible fabric material, such as, but not limited to commercially available materials such a Spandex®, Nylon, Kevlar® or Dyneema®.

In one exemplary embodiment, conductive sheet 18 is made from a conductive polymer material. In other embodiments, the conductive sheet 18 may be a conductive polymer, conductive fabric, thin sheet of metal, or composite.

In this exemplary embodiment, the conductive sheet 18 is not part of a composite system. In other embodiments, the conductive sheet 18 may have a backing material applied thereto to form a composite film system. In an embodiment, the backing material may be semi-flexible to bring the conductive sheet 18 back to its original position after the force has been removed. In an embodiment, the backing material may also distribute the impact force over the sensor area. In an embodiment, the backing material may be a foam or rubber.

The arrangement in FIG. 1 illustrates how a setup may be used as an impact sensor according to an embodiment of the disclosure. Conductive sheet 18 is placed over wire traces 12, 14 in the exemplary embodiment. Conductive sheet 18 is separated from wire traces 12, 14 by the thickness of threads 26 used to attach wire traces to the carrier material 16. The thread serves two purposes. First, threads 26 secure wire traces 12, 14 to base carrier material 16 and second, threads 26 provide a nonconductive spacer material to prevent the conductive sheet 18 from contacting the wires when no force is applied to the impact sensor 10. Initially, the resistance between the two non-contacting wires is measured. When an external force is applied to the conductive sheet 18 over wire traces 12, 14, it compresses the threads allowing the conducive film to contact both wires between the spaces and the thread. Continuity between wire traces 12, 14 is made through the conductive sheet 18, thus allowing electrical current to flow between wires traces 12, 14. The resistance between the two wires can be measured allowing the pressure to be estimated—e.g., the harder the conductive sheet 18 is pressed the more contact the film makes with wire traces 12, 14. In various embodiments and as discussed below, the separation distance, wire trace diameter and thread diameter, and thread spacing between conductive trace overlap may be selected to allow for material selection, sensor sensitivity, and operational environment for an application.

Figure 2B:
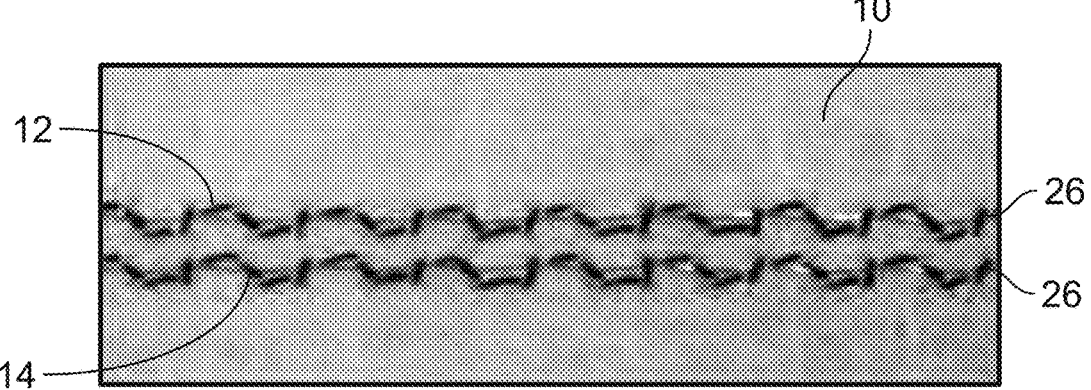
FIG. 2B shows an impact sensor of FIG. 1 having a medium stitch density.
Figure 2C:
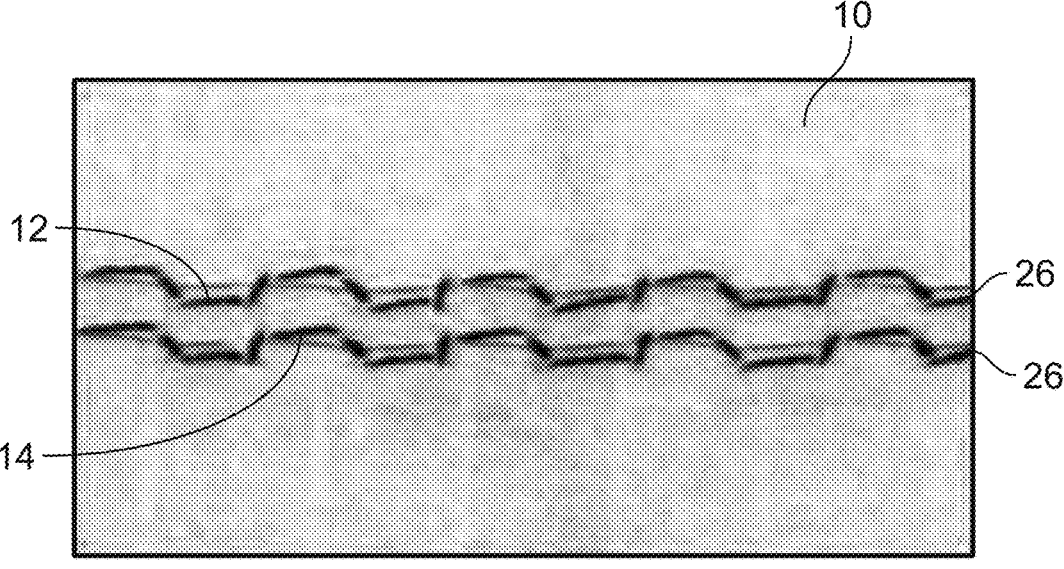
FIG. 2C shows an impact sensor of FIG. 1 having a low stitch density.

Referring next to FIGS. 2A, 2B and 2C, the sensitivity level of textile impact sensor 10 may be adjusted based on the stitching density used to secure wire traces 12, 14 to the base carrier material. The higher the density of the threads, i.e., more stitches per unit of length used to cover wire traces

12, 14, the lower the sensitivity to impact of impact sensor 10. The lower the density of the threads, i.e., fewer stitches per unit of length used to cover the wire, the higher sensitivity to impact of impact sensor 10. FIG. 2A shows a sensor 10 having a high stitch density. FIG. 2B shows a sensor 10 having a medium and FIG. 2C shows a sensor 10 having a low stitch density. Threads 26 are shown in each embodiment. High stitch density (FIG. 2A) results in less of the conductive wire traces 12, 14 available to contact conductive sheet 18 resulting in a lower sensitivity sensor. Low stitch density (FIG. 2B, 2C) increases the amount of conductive wire traces 12, 14 available to contact conductive sheet 18, thus increasing, respectively, the sensitivity of sensor 10 to impact. Exemplary stitch types may include zig-zag stitches, square stitches and basket stitches, which are known in the art.

An optional mesh material 20 may be integrated into sensor 10. Mesh material 20 and conductive sheet 18 is placed over the additional layer comprising nonconductive mesh material 20 which may be disposed between conductive wires traces 12, 14, and conductive sheet 18, in addition to controlling the stitch density to adjust sensitivity. A layer of mesh material 20 is beneficial in a scenario where the textile sensor 10 may be wrinkled, causing unintentional contact of the conductive sheet 18 with conductive wire traces 12, 14, and resulting in false indications of impact. Adding this layer of mesh material may further reduce the sensitivity to detect an impact, but also reduces false indications of impact.

Figures 3, 4:
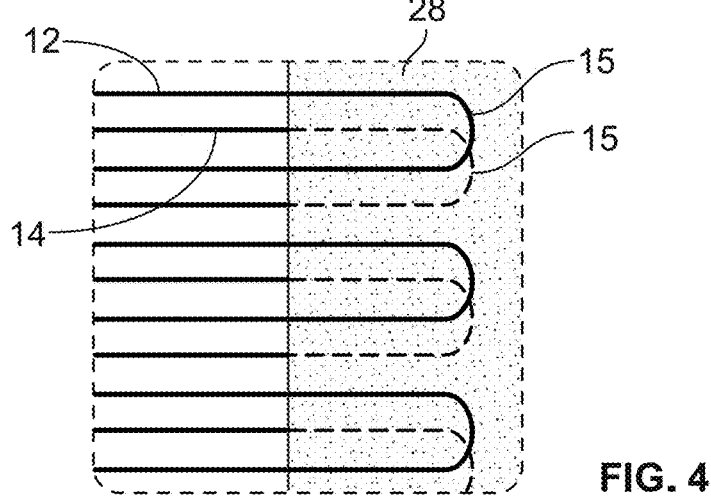
FIG. 3 shows two non-contacting wire traces in an exemplary impact sensor.
FIG. 4 shows an enlarged sectional view of FIG. 3.

Referring next to FIG. 3, two non-contacting wire traces 12, 14 are shown in an exemplary impact sensor 10. FIG. 4 shows an enlarged sectional view of FIG. 3. Wire traces 12, 14 are sewn in a serpentine wire path separated at the ends 15 with tape 28 according to an embodiment of the disclosure. As can be seen in FIG. 3, two continuous wire traces 12, 14 are stitched to base carrier material 16 to create textile impact sensor 10 using this technique. The two paths for wire traces 12, 14 run in a serpentine pattern and are prevented from contacting each other at the bend radius ends using nonconductive tape 28.

Figure 5:
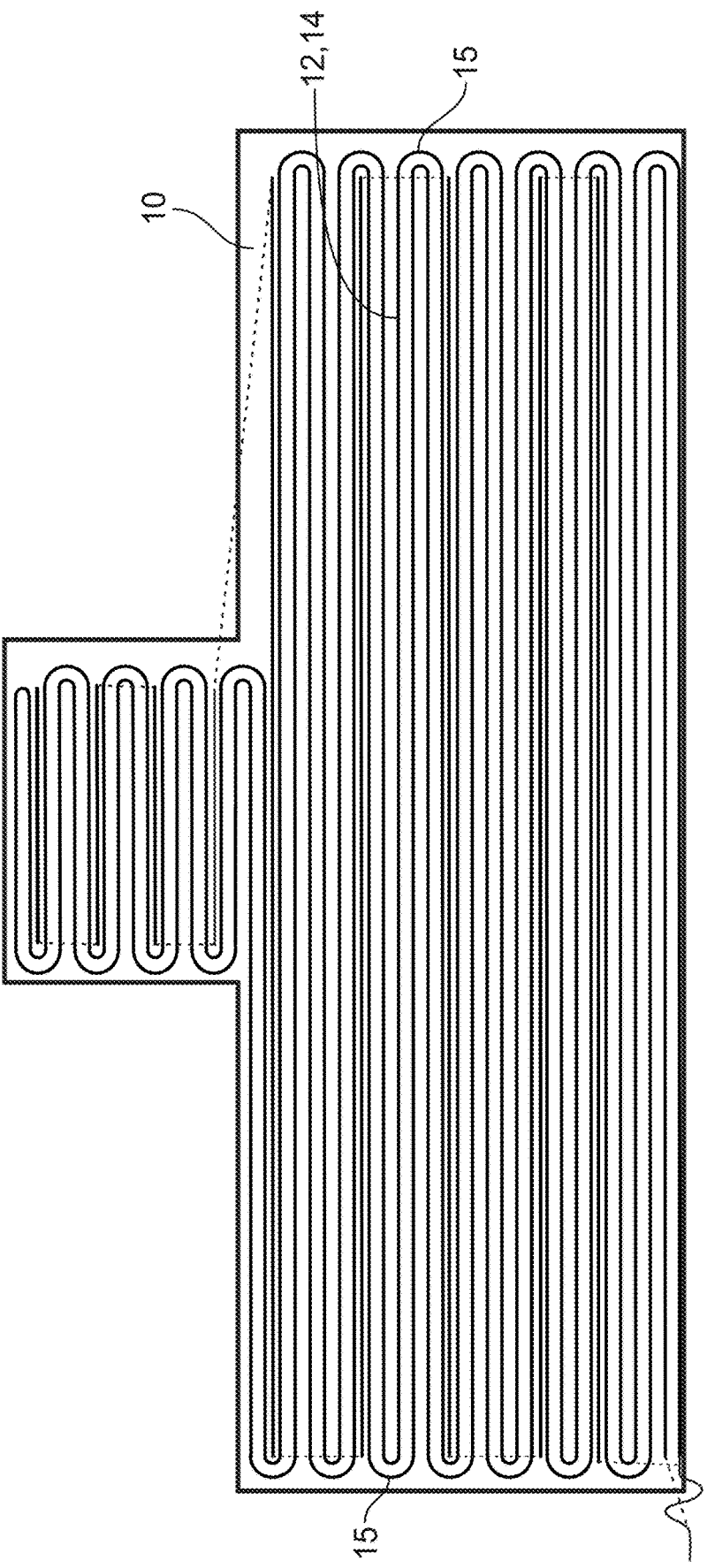
FIG. 5 shows an alternate embodiment of a textile impact sensor.

Referring next to FIG. 5, an alternate embodiment of textile impact sensor 10 is shown in which the wire traces 12, 14 are attached to the base carrier material 16 in a non-overlapping, or nested, serpentine pattern. In the arrangement of FIG. 5, wire traces 12, 14 are not overlapping at ends 15 where the path of traces 12, 14 turn around, nor are the traces overlapping at any point along the surface of base carrier material 16. Since traces 12, 14 do not overlap, the need for non-conductive tape 28 is eliminated.

Figure 6:
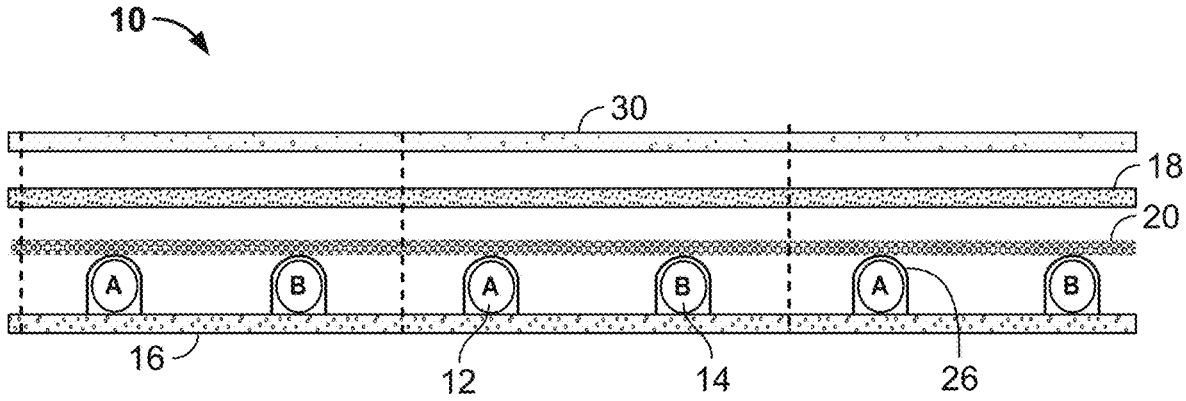
FIG. 6 is a schematic showing a cross-section of the textile impact sensor.

Referring to FIG. 6, a layer of nonconductive mesh material 20 may be placed over wires traces 12, 14. Then a layer of conductive sheet 18 and a protective cover fabric 30 are placed in the stack up of materials to create the textile impact sensor.

The conductive wire traces 12, 14 are electrically connected to a system that measures and monitors the resistance between the wire traces 12, 14. Changes in conductance measured between wire traces 12 and 14 indicate an impact over the at least two wire traces 12, 14. In an embodiment, a detected change in conductance can indicate an impact, such as a hit, kick or punch. In an embodiment, when a change in conductance is detected, sensor 10 can be used to signal an alarm. In an embodiment, a microcontroller may be used to measure voltage and send a Wi-Fi or Bluetooth signal to a hit counter which controls the scoreboard. Time Domain Reflectometry (TDR) can be used to estimate the location of impact.

Various articles may include the sensor system, such as, but not limited to personnel vests, clothing, body armor, helmets, armor, vehicle panels, shielding, punching bags, structural components such as doors, walls and floors, vehicle panels, perimeter intrusion detection assessment systems (PIDAS). In an embodiment, integrating the sensor system into panels such as, but not limited to doors, walls, floors and ceiling may be used to detect intrusion, tampering and/or movement. In an embodiment, the sensor system may be covered by a fabric such as, but not limited to carpet. Additionally, by measuring the impact at various points in the sensor system, the direction of impact may be ascertained using TDR.

In various other embodiments, the layers and fabrics may be part of composite and/or layered components that may provide additional features to the sensor system. In various embodiments, various combinations of carrier materials, thread covering materials, wire conductor materials, and conductive sheet 18 materials and dimensions may be used for specific applications to customize the impact monitoring for a specific application. For example, waterproof applications utilize two waterproof external layers to prevent water intrusion into the sensor area. Highly robust sensor system can be made using high strength materials such as stainless steel braided cable sewn to Kevlar base fabric with Kevlar threads.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the resistance-based textile impact sensor systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. An impact sensor system, comprising:
a non-conductive carrier material;
at least two conductive traces attached to the carrier material;
a plurality of threads, the threads attaching the at least two conductive traces to the carrier material;
a non-conductive covering material; and
a conductive sheet disposed over the non-conductive covering material;
wherein the non-conductive covering material is applied to the at least two conductive traces to at least partially cover the surface of the at least two conductive traces facing the conductive sheet
wherein an electrical continuity between the at least two wire traces being induced through the conductive sheet in response to an impact force allowing electrical current to flow between the at least two wires traces; and
wherein a measured amount of pressure of the impact force is determined based on a change in resistance between the at least two wire traces.

2. The impact sensor system of claim 1, wherein the plurality of threads comprises cotton, polymer or mixtures thereof.

3. The impact sensor system of claim 1, further comprising a conductive thread or yarn; and wherein the threads are attached by stitching the threads over the conductive traces into the carrier material.

4. The impact sensor system of claim 1, wherein the threads are attached by technical embroidery.

5. The impact sensor system of claim 1, wherein the non-conductive covering material is attached to the carrier material to secure the at least two conductive traces by embroidery.

6. The impact sensor system of claim 1, wherein the at least two conductive traces are separated by a separation distance.

7. The impact sensor system of claim 6, wherein the separation distance varies over at least a portion of the carrier material.

8. The impact sensor system of claim 1, wherein the conductive traces comprise one or more of a metal, a polymer material, a carbon nanotube material, or carbon nanotube yarn.

9. The impact sensor system of claim 1, wherein the conductive sheet further comprises a semi-flexible backing material forming a composite film system, the backing material being flexible and configured to return the conductive sheet to an original position after an impacting force is removed; and to distribute the force of impact across the sensor system.

10. The impact sensor system of claim 1, wherein an electrical continuity between the at least two wire traces being induced through the conductive sheet in response to an impact force allowing electrical current to flow between the at least two wires traces; and wherein the impact force is determined based on a change in resistance between the at least two wire traces.

11. The impact sensor system of claim 1, wherein a sensitivity level of the sensor system is adjusted based on the stitching density of the threads.

12. The impact sensor system of claim 1, further comprising: a mesh material; the mesh material disposed between the at least two wires traces, and the conductive sheet to adjust a sensitivity level of the sensor system.

13. The impact sensor system of claim 1, wherein the at least two wire traces are sewn into the carrier material in a serpentine path and separated at opposing ends by a tape material to form respective continuous wire paths.

14. A monitoring apparatus, comprising:
a sensor system attached to the article;
the sensor system comprising:
　a non-conductive carrier material;
　at least two conductive traces attached to the carrier material;
　a plurality of threads, the threads attaching the at least two conductive traces to the carrier material;
　a non-conductive covering material; and
　a conductive sheet disposed over the non-conductive covering material;
wherein the non-conductive covering material is applied to the at least two conductive traces to at least partially cover the surface of the at least two conductive traces facing the conductive sheet
wherein an electrical continuity between the at least two wire traces being induced through the conductive sheet in response to an impact force allowing electrical current to flow between the at least two wires traces; and
wherein a measured amount of pressure of the impact force is determined based on a change in resistance between the at least two wire traces.

15. The article of claim 14, wherein the article is a martial arts uniform component.

16. A system, comprising:
a non-conductive carrier material;
　at least two conductive traces attached to the carrier material;
　a plurality of threads, the threads attaching the at least two conductive traces to the carrier material;
　a non-conductive covering material; and
　a conductive sheet disposed over the non-conductive covering material;
　wherein the non-conductive covering material is applied to the at least two conductive traces to at least partially cover the surface of the at least two conductive traces facing the conductive sheet;
wherein the at least two wire traces are sewn into the carrier material in a serpentine path in which the two wire traces overlap and are prevented from contacting each other by a tape
wherein an impact force is determined based on the at least two wire traces.

17. The system of claim 16, wherein the at least two wire traces are sewn into the carrier material in a serpentine path in which the two wire traces overlap at a bend and are prevented from contacting each other at the bend by a tape.

\* \* \* \* \*